US011325255B2

(12) United States Patent
Luo

(10) Patent No.: US 11,325,255 B2
(45) Date of Patent: May 10, 2022

(54) METHOD FOR CONTROLLING ROBOT AND ROBOT DEVICE

(71) Applicant: CLOUDMINDS (SHENZHEN) ROBOTICS SYSTEMS CO., LTD., Shenzhen (CN)

(72) Inventor: Lei Luo, Shenzhen (CN)

(73) Assignee: CLOUDMINDS ROBOTICS CO., LTD., Shanghai (CN)

(*) Notice: Subject to any disclaimer, the term of this patent is extended or adjusted under 35 U.S.C. 154(b) by 456 days.

(21) Appl. No.: 16/668,647

(22) Filed: Oct. 30, 2019

(65) Prior Publication Data
US 2020/0061822 A1    Feb. 27, 2020

Related U.S. Application Data

(63) Continuation of application No. PCT/CN2017/081484, filed on Apr. 21, 2017.

(51) Int. Cl.
*B25J 9/16* (2006.01)
*B25J 13/00* (2006.01)
(Continued)

(52) U.S. Cl.
CPC ........... *B25J 9/1664* (2013.01); *B25J 13/003* (2013.01); *B25J 13/08* (2013.01); *B25J 13/089* (2013.01);
(Continued)

(58) Field of Classification Search
CPC ........ B25J 9/1664; B25J 13/003; B25J 13/08; B25J 13/089; B25J 9/0003; G06F 3/013; G10L 15/22; G10L 2015/223
(Continued)

(56) References Cited

U.S. PATENT DOCUMENTS 5,481,622 A * 1/1996 Gerhardt ................ A61B 3/113
345/158
5,912,721 A * 6/1999 Yamaguchi .......... G06V 40/193
351/209
(Continued)

FOREIGN PATENT DOCUMENTS

CN    101576384 A    11/2009
CN    102323817 A    1/2012
(Continued)

OTHER PUBLICATIONS

1st Office Action dated Oct. 27, 2020 by the JP Office; Appln.No. 2019-554521.
(Continued)

*Primary Examiner* — Jaime Figueroa

(57) ABSTRACT

A method for controlling a robot includes: establishing a reference coordinate system; capturing a user's gaze direction of an indicated target; acquiring a sight line angle of the robot; acquiring a position of the robot; acquiring a linear distance between the robot and the user; calculating in real time a gaze plane in a user's gaze direction relative to the reference coordinate system based on the sight line angle of the robot, the position of the robot and the liner distance between the robot and the user; and smoothly scanning the gaze plane by the robot to search for the indicated target in the user's gaze direction.

18 Claims, 6 Drawing Sheets

(51) Int. Cl.
| | |
|---|---|
| *B25J 13/08* | (2006.01) |
| *G06F 3/01* | (2006.01) |
| *B25J 9/00* | (2006.01) |
| *G10L 15/18* | (2013.01) |
| *G10L 15/22* | (2006.01) |
| *G06V 20/10* | (2022.01) |
| *B25J 11/00* | (2006.01) |

(52) U.S. Cl.
CPC .............. *G06F 3/013* (2013.01); *G06V 20/10* (2022.01); *G10L 15/1815* (2013.01); *G10L 15/22* (2013.01); *B25J 9/0003* (2013.01); *B25J 11/008* (2013.01); *G10L 2015/223* (2013.01)

(58) Field of Classification Search
USPC .......................................... 700/257, 245–264
See application file for complete search history.

(56) References Cited

U.S. PATENT DOCUMENTS

| | | | | |
|---|---|---|---|---|
| 6,118,888 | A * | 9/2000 | Chino | G06F 3/017 |
| | | | | 715/705 |
| 6,351,573 | B1 * | 2/2002 | Schneider | G16H 20/40 |
| | | | | 382/128 |
| 7,043,056 | B2 * | 5/2006 | Edwards | G06V 40/20 |
| | | | | 382/118 |
| 7,809,160 | B2 * | 10/2010 | Vertegaal | G06T 7/254 |
| | | | | 345/157 |
| 8,041,456 | B1 * | 10/2011 | Blackwell | B25J 9/1674 |
| | | | | 901/1 |
| 8,885,882 | B1 * | 11/2014 | Yin | G06T 7/73 |
| | | | | 382/103 |
| 9,237,844 | B2 * | 1/2016 | De Bruijn | G06F 3/147 |
| 10,157,313 | B1 * | 12/2018 | Zhang | B25J 13/00 |
| 11,199,898 | B2 * | 12/2021 | Blume | G06F 3/012 |
| 2005/0175218 | A1 * | 8/2005 | Vertegaal | G06V 40/20 |
| | | | | 345/157 |
| 2012/0038739 | A1 * | 2/2012 | Welch | H04N 13/388 |
| | | | | 345/426 |
| 2013/0083976 | A1 | 4/2013 | Ragland | |
| 2016/0114488 | A1 | 4/2016 | Mascorro Medina et al. | |
| 2017/0102768 | A1 | 4/2017 | Zhang | |

FOREIGN PATENT DOCUMENTS

| | | |
|---|---|---|
| CN | 102830793 A | 12/2012 |
| CN | 102915039 A | 2/2013 |
| CN | 103170980 A | 6/2013 |
| CN | 103264393 A | 8/2013 |
| CN | 103761519 A | 4/2014 |
| CN | 104685541 A | 6/2015 |
| CN | 104951808 A | 9/2015 |
| CN | 106294678 A | 1/2017 |
| JP | 2005028468 A | 2/2005 |
| JP | 2006003263 A | 1/2006 |
| JP | 2008254122 A | 10/2008 |
| JP | 2009223172 A | 10/2009 |
| JP | 2010112979 A | 5/2010 |
| JP | 2015163415 A | 9/2015 |
| JP | 2015197329 A | 11/2015 |
| JP | 5891553 B2 | 3/2016 |
| JP | 2016166952 A | 9/2016 |
| WO | 2008007781 A1 | 1/2008 |

OTHER PUBLICATIONS

International Search Report dated Jan. 25, 2018; PCT/CN2017/081484.

* cited by examiner

METHOD FOR CONTROLLING ROBOT AND ROBOT DEVICE

CROSS-REFERENCE TO RELATED APPLICATIONS

This application is a continuation of International Application No. PCT/CN2017/081484 with an international filing date of Apr. 21, 2017, the entire contents of which are incorporated herein by reference.

TECHNICAL FIELD

The present application relates to the technical field of robot control, and in particular, relates to a method for controlling a robot and a robot device.

BACKGROUND

At present, the application of robots is still relatively in the primary stage, and the robots are mainly for making dialogs and chatting with users. Even if some robots are capable of performing other tasks, the experience is not good.

In related art: Using a scenario where a user requests a robot to take an article, the robot may only acquire, by voice identification, what article the user desires, where the article is approximately positioned, and then find the article. However, in most cases, the user does not expect to describe in detail where the article is, and what the article is like, but only points to the article or places a glance at the article. In this case, the robot definitely fails to acquire a sight line of the user, and thus fail to know what article the user gazes or sees.

SUMMARY

An embodiment of the present application provides a method for controlling a robot. The method includes: establishing a reference coordinate system; capturing a user's gaze direction of an indicated target; acquiring a sight line angle of the robot; acquiring a position of the robot; acquiring a linear distance between the robot and the user; calculating in real time a gaze plane in a user's gaze direction relative to the reference coordinate system based on the sight line angle of the robot, the position of the robot and the liner distance between the robot and the user; and smoothly scanning the gaze plane by the robot to search for the indicated target in the user's gaze direction.

Another embodiment of the present application provides a robot device. The robot device includes: at least one processor; and a memory communicably connected to the at least one processor; wherein the memory stores an instruction program executable by the at least one processor, wherein, the instruction program, when being executed by the at least one processor, cause the at least one processor to perform the steps of: establishing a reference coordinate system; capturing a user's gaze direction of an indicated target; acquiring a sight line angle of the robot; acquiring a position of the robot; acquiring a linear distance between the robot and the user; calculating in real time a gaze plane in a user's gaze direction relative to the reference coordinate system based on the sight line angle of the robot, the position of the robot and the liner distance between the robot and the user; and smoothly scanning the gaze plane to search for the indicated target in the user's gaze direction.

Still another embodiment of the present application provides a computer program product. The computer program product includes a software code portion, wherein the software code portion is configured to, when being run in a memory of a computer, perform steps of: establishing a reference coordinate system; capturing a user's gaze direction of an indicated target; acquiring a sight line angle of the robot; acquiring a position of the robot; acquiring a linear distance between the robot and the user; calculating in real time a gaze plane in a user's gaze direction relative to the reference coordinate system based on the sight line angle of the robot, the position of the robot and the liner distance between the robot and the user; and smoothly scanning the gaze plane to search for the indicated target in the user's gaze direction.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

Figure 1:
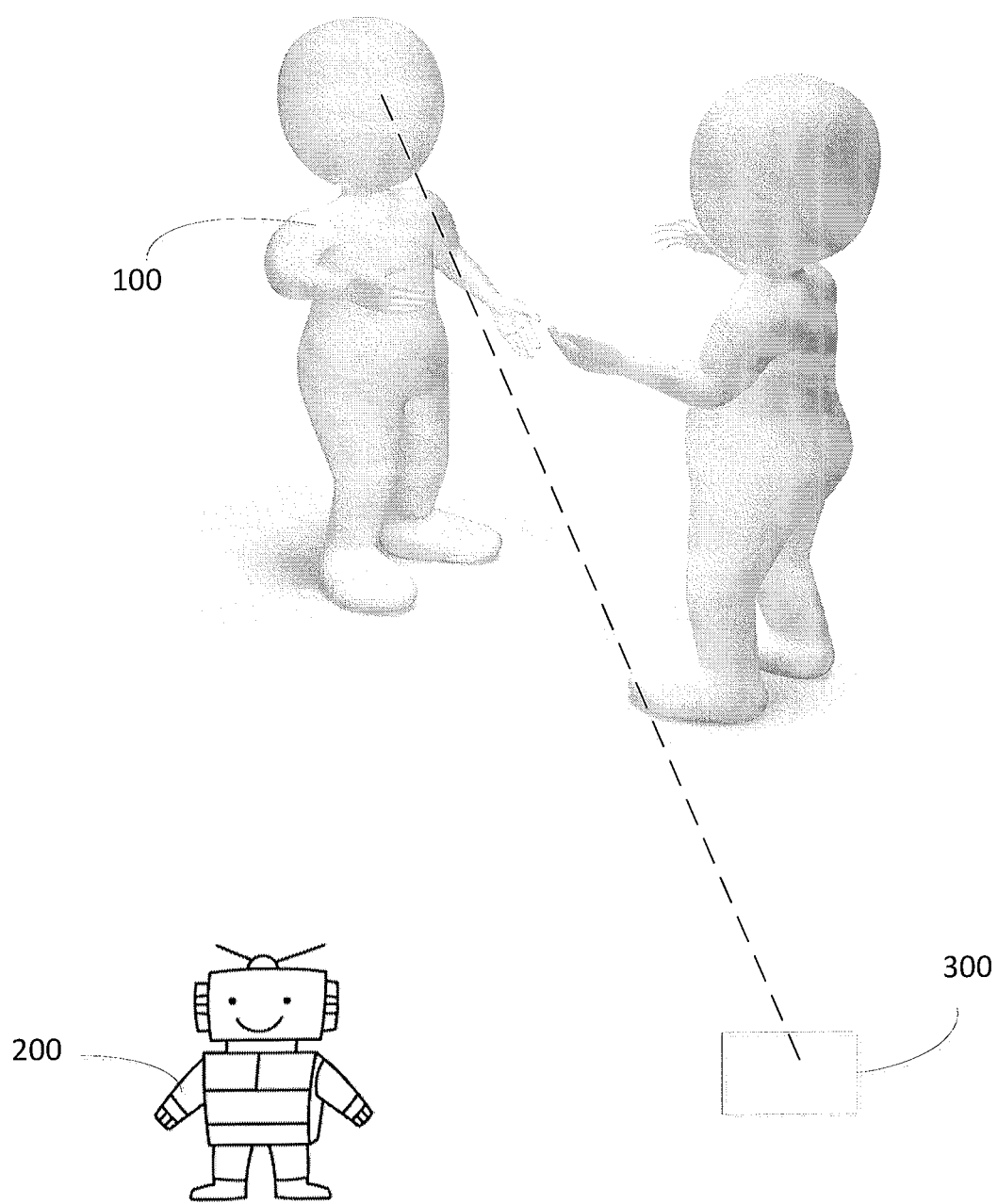
FIG. 1 is an application environment diagram of a robot device according to an embodiment of the present application.

For clearer descriptions of the objectives, technical solutions, and advantages of the present application, the present application is further described with reference to specific embodiments and attached drawings. It should be understood that the specific embodiments described herein are only intended to explain the present application instead of limiting the present application.

Unless the context clearly requires otherwise, throughout the specification and the claims, technical and scientific terms used herein denote the meanings as commonly understood by a person skilled in the art. Additionally, the terms used in the specification of the present application are merely for description the embodiments of the present application, but are not intended to limit the present application. As used herein, the term "and/or" in reference to a list of two or more items covers all of the following interpretations of the term: any of the items in the list, all of the items in the list and any combination of the items in the list.

In addition, technical features involved in various embodiments of the present application described hereinafter may be combined as long as these technical features are not in conflict.

In recent years, with rapid developments of the computer technologies, information technologies, communication technologies and microelectronic technologies, mobile robot technologies have gained extensive application, for example, cleaning robots, restaurant waiter robots and robots chatting with persons. In the process where the robots moves towards and tracks a target, the target may be positioned by using the global navigation satellite system (GNSS) and ultra wideband (UBW) together with pre-deployed network nodes. By the GNSS and UWB-based positioning, the robot may acquire precise, uninterrupted and stable location information, and high-precision positioning may be practiced in a complicated environment. Nevertheless, other positioning methods may also be adopted for the robot, which are not limited in the embodiments of the present application.

The robot is generally equipped with one or a plurality of cameras. For example, a camera may be arranged on the face of the robot, which functions as the eyes of the robot. An optical axis is a symmetric axis of an optical system. The optical axis of the camera is a line passing through the center of the lens of the camera, that is, the central line of the light beam (light column). The light beam rotates about the optical axis, and no optical characteristic change shall exist.

In the related art, the robot searches for a target based on a simpler voice instruction of a user. In most cases, the user does not expect to describe in detail where the article is and what the article is like, but simply points at the article and places a glance at the article. It is apparent that the robot in the related art fails to acquire a sight line of the user, and thus fails to know what article the user gazes. In another aspect, when two or more persons are talking about an article, generally the article is indicated by simply pointing at the article or giving a glance at the article. The robot may fail to clearly know which article or what article is mentioned, and thus fail to associate the voice information with the corresponding article. Therefore, the robot fails to collect effective information of the article which the persons are talking about.

Therefore, if the embodiments of the present application provide a method for controlling a robot to enable the robot to acquire what the user is gazing or at least acquire the sight line of the user, a search range may be significantly narrowed, and the robot may simply acquire the target.

FIG. 1 illustrates an application environment of a method for controlling a robot according to an embodiment of the present application. As illustrated in FIG. 1, the application environment involves a user 100, a robot 200 and an article 300. When the user 100 is talking with the robot 200 or talking with another user, and mentions and gazes the article 300 in the neighborhood, the user 100 speaks to the robot "Tom, please pass that book to me." The robot 200 needs to acquire a sight line direction of the user 100 to more accurately know which book the user desires.

Figure 2A:
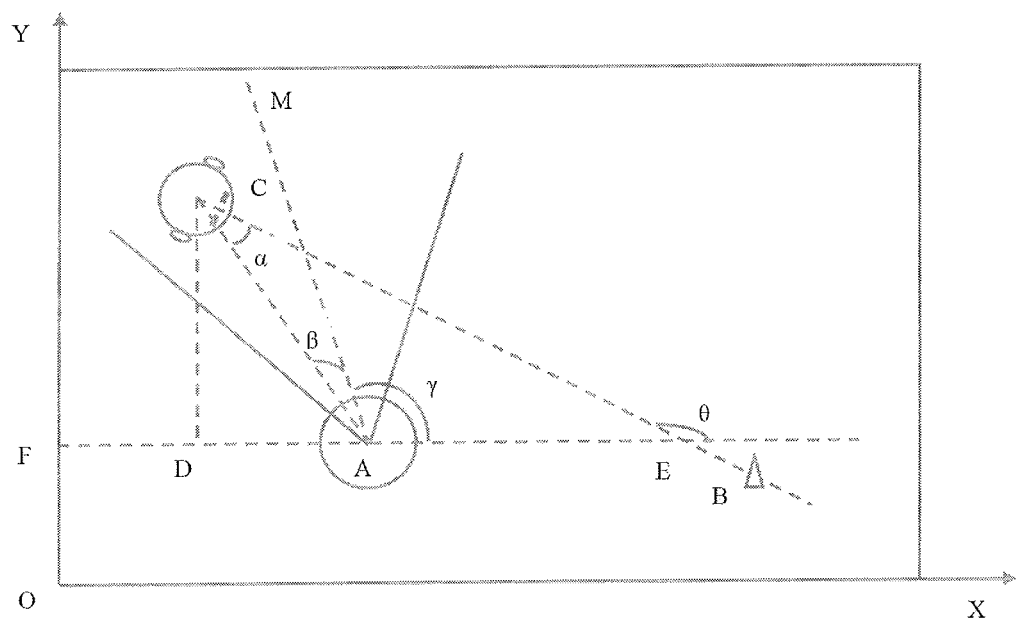
FIG. 2a, FIG. 2b and FIG. 2c are top views of a scenario of a method for controlling a robot according to an embodiment of the present application.
Figure 2B:
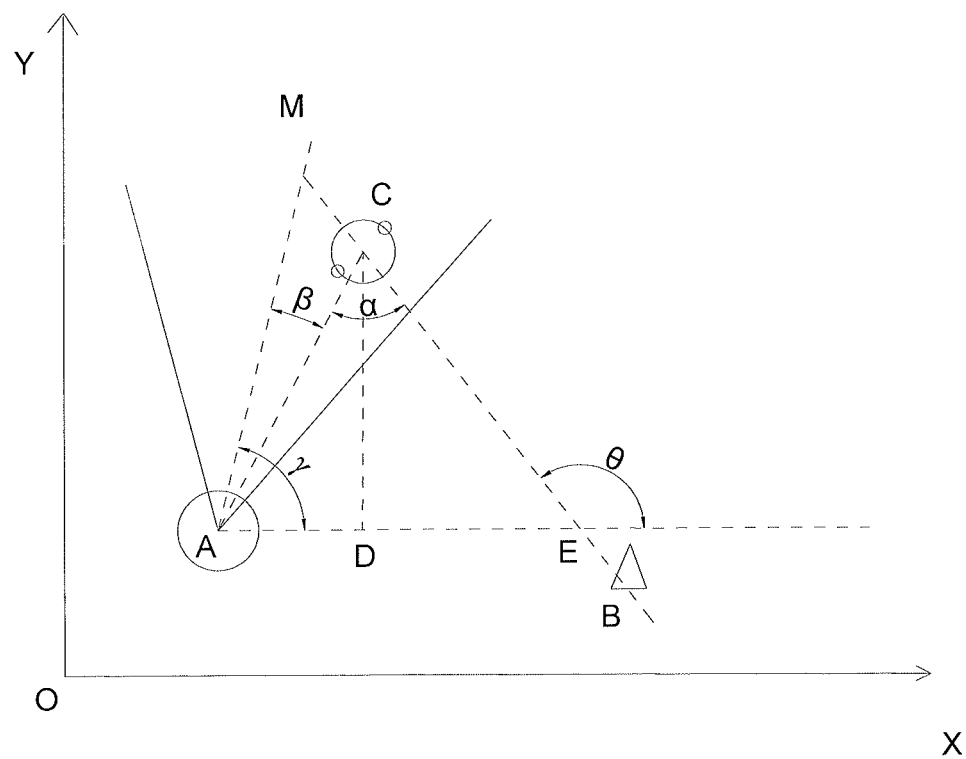

FIG. 2a and FIG. 2b are top views of a scenario of a method for controlling a robot according to an embodiment of the present application. Straight line AM is a sight line angle of the robot, which is specifically an optical axis of a sight line of the robot. Assuming that the top views of the space where the user 100 is located are as illustrated in FIG. 2a and FIG. 2b, then the lower left corner is used as coordinates (0, 0) of the reference coordinate system, and the user is located at point C and speaks to robot S "Tom, please pass that book to me," while glancing at and pointing to the book at position T. The robot may be gazing the user at this moment, or may be busying with other work while turning to the user but not directly gazing the user, and instead, the user enters the view of the robot.

At this moment, if the robot hearing the call is capable of viewing the face of the user within its own view angle, an included angle between a facing direction (a facing forward direction) and the optical axis of the robot is determined by a specific face recognition and analysis algorithm (other algorithms may also be used as long as the data is obtained). In this way, an absolute direction of the user's facing direction in the current coordinate system may be calculated. The method for controlling a robot is described hereinafter in detail.

Figure 3:
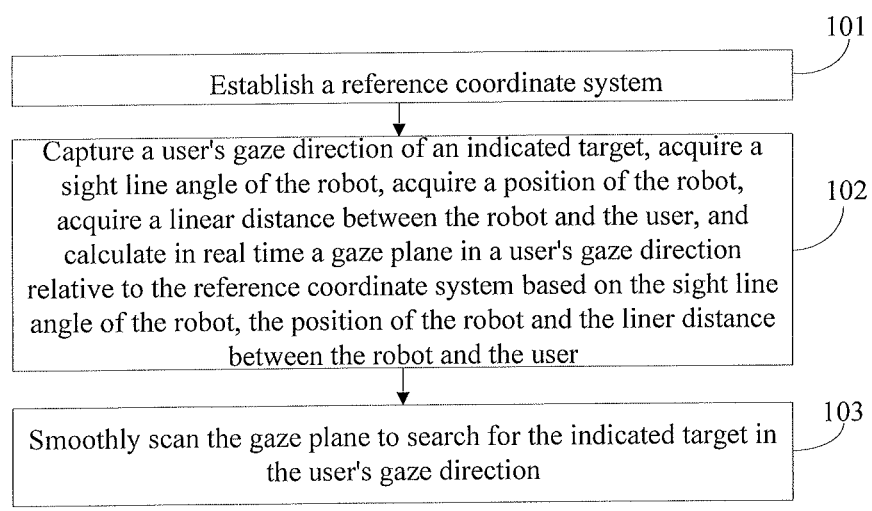
FIG. 3 is a schematic flowchart of a method for controlling a robot according to an embodiment of the present application.

As illustrated in FIG. 3, the method for controlling a robot according to an embodiment of the present application includes the following steps:

Step 101: A reference coordinate system is established.

An indoor environment may be positioned by the above positioning method for the robot. It is assumed that a point in a real space is a coordinate origin (0, 0). Based on indoor positioning, the robot may acquire the position thereof at any time, and calculates coordinates thereof.

Step 102: A user's gaze direction indicative of a target article is acquired, a sight line angle of the robot is acquired, a position of the robot is acquired, a linear distance between the robot and the user is acquired, and a gaze plane in a user's gaze direction relative to the reference coordinate system is calculated in real time based on the sight line angle of the robot, the position of the robot and the liner distance between the robot and the user.

In a three-dimensional space, the gaze plane is a plane perpendicular to the ground, and a straight line of the user's gaze direction is obtained by viewing the gaze plane from the top. That is, the straight line is straight line CB as illustrated in FIG. 2a and FIG. 2b. FIG. 2a is different from FIG. 2b in that in the reference coordinate system, the robot in FIG. 2a is located on the right side of the user, and the robot in FIG. 2b is on the left side of the user.

Further, the sight line angle of the robot is the optical axis of the sight line of the robot. The calculating a gaze plane in a user's gaze direction relative to the reference coordinate system in real time based on the sight line angle of the robot, the position of the robot and the liner distance between the robot and the user specifically includes:

Coordinates (m, n) of the robot in the reference coordinate system are calculated based on the position of the robot, and an included angle γ between the optical axis of the sight line of the robot and the X axis of the reference coordinate system is calculated; an included angle β between a straight line of the line between the position of the user and the position of the robot, and the optical axis of the sight line of the robot is calculated based on the sight line angle of the robot, the position of the robot and the position of the user; an included angle between the straight line of the line between the position of the user and the position of the robot, and the user's gaze direction is calculated; and the gaze plane of the user's gaze direction relative to the reference coordinate system is calculated in real time based on the included angle γ between the optical axis of the sight line of the robot and the X axis of the reference coordinate system, the included angle β between the straight line of the line between the position of the user and the position of the robot and the user's gaze direction, and the linear distance between the robot and the user.

As illustrated in FIG. 2a and FIG. 2b, the position of the user is point C, the position of the indicated target is point B, the position of the robot is point A. A longitudinal line parallel to the Y axis of the reference coordinate system is drawn along the position, point C, of the user, a horizontal line parallel to the X axis of the reference coordinate system is drawn along the position, point A, of the robot. The horizontal line and the longitudinal line intersect at point D, the horizontal line and the straight line of the user's gaze direction intersect at point E. Based on inference from the inner angle sum of the triangular, an outer angle of the triangle is equal to the sum of two inner angles that are not adjacent to the outer angle. An outer angle θ of triangle ACE at point E is calculated by the following equation:

$$\theta = \alpha + \beta + \gamma$$

It should be noted that in FIG. 2a, $\theta=\alpha+\beta+\gamma$, whereas in FIG. 2b, $\theta=\alpha-\beta+\gamma$. With respect to the value of β, when the sight line angle of the robot is rotated by the included angle β counterclockwise to the position of the user, the value of β is defined as a positive value; and the sight line angle of the robot is rotated by the included angle β clockwise to the position of the user, the value of β is defined as a negative value.

In triangle ACD, AD and CD are calculated by the following equations:

$$AD = d*\cos(180°-\beta-\gamma) = -d*\cos(\beta+\gamma)$$

$$CD = d*\sin(180°-\beta-\gamma) = d*\sin(\beta+\gamma)$$

In the reference coordinate system, O is the origin, the horizontal line and the Y axis intersect at point F, and coordinates of the position, point A, of the robot are (m, n), and in this case, m=FA, and n=OF; coordinates of the position, point C, of the user are (j, k), and in this case, j=FA−AD, k=OF+CD. AD, CD, in and n are introduced to the equations to obtain the coordinates of point C (m+d*cos(β+γ), n+d*sin(β+γ)).

The straight line where the user's gaze direction is defined as a linear equation y=k*x+b, wherein k=tan θ=tan(α+β+γ).

k is introduced into the coordinates (m+d*cos(β+γ), n+d*sin(β+γ)) of point C, it may be obtained:

$$b = y - k*x = n + d*\sin(\beta+\gamma) - \tan(\alpha+\beta+\gamma)*(m+d*\cos(\beta+\gamma))$$

Then the linear equation of the straight line of the user's gaze direction is:

$$y = \tan(\alpha+\beta+\gamma)*x + n + d*\sin(\beta+\gamma) - \tan(\alpha+\beta+\gamma)*(m+d*\cos(\beta+\gamma))$$

The gaze plane is a plane that is along a forward direction of the linear equation y=tan(α+β+γ)*x+n+d*sin(β+γ)−tan(α+β+γ)*(m+d*cos(β+γ)) and perpendicular to the ground, with (m+d*cos(β+γ), n+d*sin(β+γ)) as a start point.

In some embodiments, the user's gaze direction is captured, and a signal for searching for the target indicated by the user may be generated based on the user's gaze direction; and the sight line angle of the robot, the position of the robot and the linear distance between the robot and the user are acquired based on the signal for searching for the target indicated by the user.

During conversation between the user and other persons, the user gazes the indicated target. In this case, the robot may proactively capture the user's gaze direction. Alternatively, the robot may also capture the user's gaze direction based on an instruction for the user, for example, the dialog between the user and the robot "Tom, please pass that book to me," which is a voice instruction. The robot may proactively capture the user's gaze direction without the instruction sent by the user.

If the user sends an instruction, the robot receives a target search instruction from the user, and captures the user's gaze direction based on the target search instruction.

Step 103: The robot smoothly scans the gaze plane to search for the indicated target in the user's gaze direction.

Specifically, one or a plurality of robots may be provided. Optionally, the robot smoothly scans the gaze plane at a predetermined time interval to search for the indicated target in the user's gaze direction. The predetermined time interval may be specifically 0.1 to 5 seconds, which is defined in combination with the sight line of the robot and the resolution of the camera of the robot.

Specifically, the camera of at least one robot is controlled to focus on a portion of the plane between the position of the user and the target indicated by the user in the gaze plane, to search for the indicated target in the user's gaze direction.

More specifically, the robot may search for the indicated target in the user's gaze direction with no need to moving towards the indicated target. If the robot rightly stands in the gaze plane, the robot only needs to move forward or backward along the gaze plane. If the robot rightly stands at a position where the gaze plane may be clearly captured and the gaze plane may be smoothly scanned, the robot only needs to turn the head thereof to search for the indicated target. In this case, the optical axis of the sight line of at least one robot is controlled to deflect from the position of the user to the target indicated by the user, and an optical axis of the sight line upon the deflection is acquired; an included angle γ' between the optical axis of the sight line upon the deflection and the X axis of the reference coordinate system is calculated based on the coordinates of the robot in the reference coordinate system; the coordinates of the robot in the reference coordinate system are calculated based on the position of the robot; a focal distance of the camera upon the deflection is calculated based on the coordinates of the robot in the reference coordinate system, the included angle γ' between the optical axis of the sight line upon the deflection and the X axis of the reference coordinate system, and the gaze plane; and based on the focal distance between the optical axis of the sight line upon the deflection and the camera upon the deflection, the focus of the camera is controlled to fall in a portion of the plane between the position of the user and the target indicated by the user in the gaze plane to search for the target indicated by the user.

The embodiment of the present application achieves the following beneficial effects: The method for controlling a robot according to the embodiment of the present application includes: establishing a reference coordinate system; capturing a user's gaze direction of an indicated target, acquiring a sight line angle of the robot, acquiring a position of the robot, acquiring a linear distance between the robot and the user, and calculating in real time a gaze plane in a user's gaze direction relative to the reference coordinate system based on the sight line angle of the robot, the position of the robot and the liner distance between the robot and the user; and smoothly scanning the gaze plane by at least one robot to search for the indicated target in the user's gaze direction. Relative to the solution that the robot searches for a target based on simpler voice instruction from the user in the related art, in the method according to the embodiment of the present application, the robot smoothly scans the gaze plane to search the indicated target, such that the search range is small, the search failure rate is low, the search accuracy is improved, and the user experience is better. In addition, in the related art, the robot fails to acquire the sight line of the user. However, in the method according to the embodiment of the present application, the robot may capture the user's gaze direction, and calculate in real time the gaze plane of the gaze direction relative to the reference coordinate system. By scanning the gaze plane, the robot may acquire what target the user gazes, and the success rate of searching for the target is improved, and the user experience is enhanced.

If the position of the robot is not ideal, the robot needs to move to approach the gaze plane to find a position where the gaze plane may be clearly captured and the gaze plane may be smoothly scanned. In this case, the robot needs to be controlled to move.

With changes of the position or the sight line angle of the robot or the user, for example, m, n, d, α, β and γ may all change, no matter whether the user is moving or the robot is moving, the calculation shall use all the data at the moment when the user gazes the direction as calculation parameters, because the straight line of the linear equation may not change, and the calculation depends only on the moment when the user indicates the target.

Figure 2C:
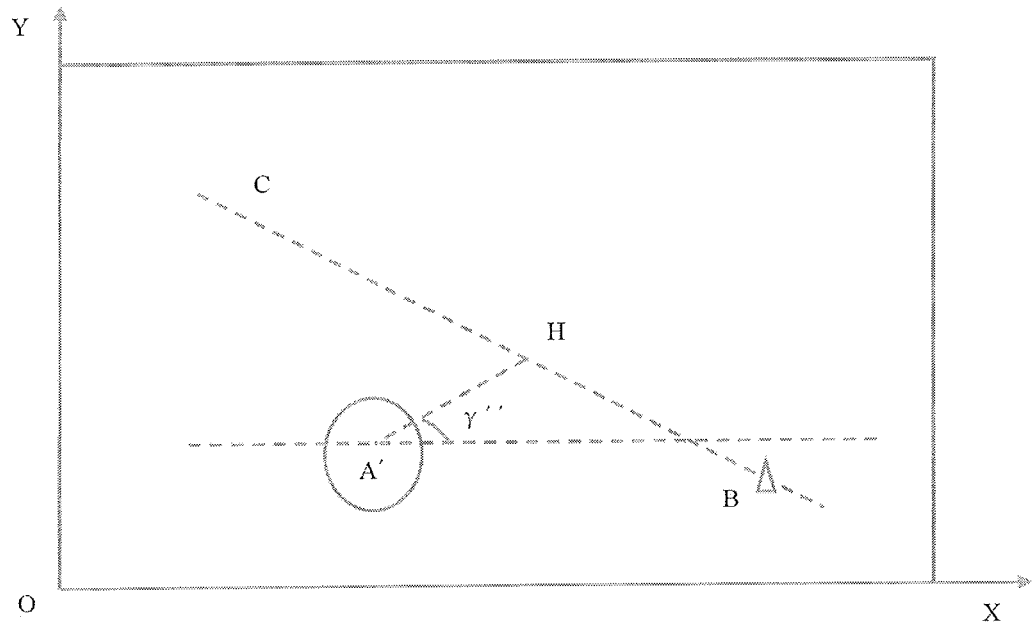

After the linear equation of the straight line of the user's gaze direction is obtained, the robot only needs to track the point on the line. No matter where the robot is located, the robot may still acquire a distance between the sight line thereof and the line, that is, the focal distance of the camera of the robot. The robot may stand at a place and calculate in real time the focal distance while turning the head thereof, such that during the rotation of the head, the focal point is always maintained on the line (which is a line in the top views, and is a plane perpendicular to the ground in the three-dimensional space, and thus during the rotation of the head, the focal point is always maintained in the gaze plane). Nevertheless, the robot may also have to search for an article originally on the sight line of the user during the movement, and in this case, the robot likewise only needs to perform the real-time calculation. As illustrated in FIG. 2c, during the movement thereof, the robot may smoothly scan straight line CB starting from point C to search for the target indicated by the user.

In some embodiments, the method for controlling a robot further includes the following step:

Step 105: A real-time position and a real-time sight line angle of the robot is acquired by the robot during movement of the robot, an intersection line between the real-time sight line angle of the robot and the gaze plane, and a focal distance are determined, and a proximity region of the intersection line is image-scanned based on the focal distance until the indicated target gazed by the user in the gaze plane is identified.

Further, the robot smoothly scans the proximity region of the intersection line by a graph search method; when the robot scans at least two targets satisfying the graph of the target indicated by the user, the robot sends a confirmation request; and if the user responds to the confirmation request, the user gives a confirmation result, and the robot selects, based on the confirmation result, one of the targets satisfying the graph of the target indicated by the user as the target indicated by the user.

Specifically, the real-time sight line angle of the robot is a real-time optical axis of the sight line of the robot. The acquiring the real-time position and the real-time sight line angle of the robot during the movement of the robot and determining the intersection line and focal distance between the real-time sight line angle and the gaze plane of the robot are described in details hereinafter:

FIG. 2c is a schematic diagram of a scenario of movement of the robot in the method for controlling a robot according to an embodiment of the present application. In FIG. 2c, during the movement of the robot, a real-time position of the robot is point A', real-time coordinates (p, q) of the robot in the reference coordinate system, and an included angle γ" between the real-time optical axis of the sight line of the robot and the X axis of the reference coordinate system are calculated based on the real-time position of the robot; and if an intersection between the real-time optical axis of the sight line of the robot and the straight line of the user's gaze direction is H, distance A'H is the focal distance.

A straight line of A'H is defined as the linear equation y=k*x+b, wherein k=tanγ". By introducing k, x and y, it may be obtained:

$$b = y - k*x = q - \tan(\gamma'')*p$$

Hence the linear equation of the straight line of A'H is obtained:

$$y = \tan(\gamma'')*x + q - \tan(\gamma'')*p$$

The linear equation and a quadric equation of the straight line of A'H and the straight line of the user's gaze direction are solved in a combination fashion:

$$y = \tan(\alpha+\beta+\gamma)*x + n + d*\sin(\beta+\gamma) - \tan(\alpha+\beta+\gamma)*(m + d*\cos(\beta+\gamma))$$

$$y = \tan(\gamma'')*x + q - \tan(\gamma'')*p$$

Solved coordinates (x, y) are coordinates of intersection H between the real-time optical axis of the sight line of the camera of the robot and the straight line of the user's gaze direction.

Distance A'H is calculated based on the coordinates of point H and the coordinates of point A', which is the focal distance.

$$A'H = \sqrt{(x-p)^2 + (y-q)^2}$$

When the robot moves or the camera rotates, p, 1 and γ" may all change. Therefore, the calculation is carried out in real time as the robot moves or the camera rotates, for example, 30 times per second (an actual count of times is dependent on a movement or rotation speed of the robot, and the higher the calculation frequency, the more accurate the calculation; however, the calculation load also increases, and the specific calculation frequency is not defined herein).

The process of determining the intersection line between the real-time sight line angle of the robot and the gaze plane, and the focal distance, and the process of identifying the indicated target gazed by the user in the gaze plane and moving towards the indicated target to acquire the indicated target are separately controlled. After the indicated target is identified, based on the focal distance, that is, the distance between the position of the robot and the indicated target, the posture of the robot or the like, the robot is controlled to move towards the indicated target, such that the indicated target is acquired. Afterwards, the position of the robot is acquired, the coordinates of the robot are calculated, and the straight line between the robot and the user is acquired. In combination with an indoor static environment, dynamic obstacles and the like, a walking route of the robot is planned, and the indicated target is taken to the user.

Alternatively, the process of determining the intersection line between the real-time sight line angle of the robot and the gaze plane, and the focal distance, and the process of identifying the indicated target gazed by the user in the gaze plane and moving towards the indicated target to acquire the indicated target may also be controlled in a centralized fashion. In this case, when the robot moves, during the movement, the robot image-scans the proximity region of the intersection line based on the focal distance until the indicated target gazed by the user in the gaze plane is identified, and then the robot is controlled to move towards the position where the focal distance (a focal distance for focusing the indicated target) is 0. In this way, the robot reaches the indicated target.

The embodiment of the present application achieves the following beneficial effects: In the method for controlling a robot according to the embodiment of the present application, during the movement of the robot, the real-time position and the real-time sight line angle of the robot are acquired, and the intersection line of the real-time sight line angle of the robot and the gaze plane, and the focal distance are acquired. In this way, the focus of the camera of the robot is controlled to fall in the gaze plane, such that a clear image that may include the indicated target is captured, wherein the image is specifically an image captured for the proximity region of the intersection line. During the movement of the robot, the robot may image-scan the proximity region of the intersection line based on the focal distance, until the indicated target gazed by the user in the gaze plane is identified. During this process, the desired parameters may all be acquired in real time, the indicated target may be quickly and accurately identified, and the user experience is better.

In the above technical solution, by analyzing the facial angle of the user, an angle α between the user and the optical axis of the sight line of the robot is acquired. However, if a robot sees the back of the user when hearing a call, an included angle between the direction which the user faces and the optical axis may not be determined by face recognition and analysis. In this case, the robot needs to firstly move to the front or the side of the user as long as the robot is capable of seeing the face of the user (it is also probable that the user needs to re-issue an instruction, and the robot needs to re-determine the included angle between the direction which the user faces and the optical axis of the sight line). Further, if the included angle between the direction to which the face of the user is opposite and the optical axis may be also be determined, from the back of the user, by image identification based on other algorithms, or other robots around the user are capable of acquiring the linear equation of the straight line of the line between the position of the user and the position of the robot, the included angle and or the linear equation may be likewise synchronized to the robot. Specifically, the method for controlling a robot further includes the following step:

Step 104: The robot includes a networking module configured to network with the robots under the same coordinate systems, wherein the networking module is configured to share data in the gaze plane.

The embodiment of the present application achieves the following beneficial effects: By the networking module, the robot is networked to the robots under the same coordinate system, and the robots share the data in the gaze plane; based on states of current processing tasks of a plurality of robots and considering the position of the robots, facing angle and the like, a robot control server may control, by calculation or analysis, one of the robots to search for the indicated target in the user's gaze direction, such that the plurality of robots collaboratively operate. In this way, the operating efficiency is improved, the user requirements are quickly satisfied, and the user experience is enhanced. The same coordinate system is the reference coordinate system.

Figure 4:
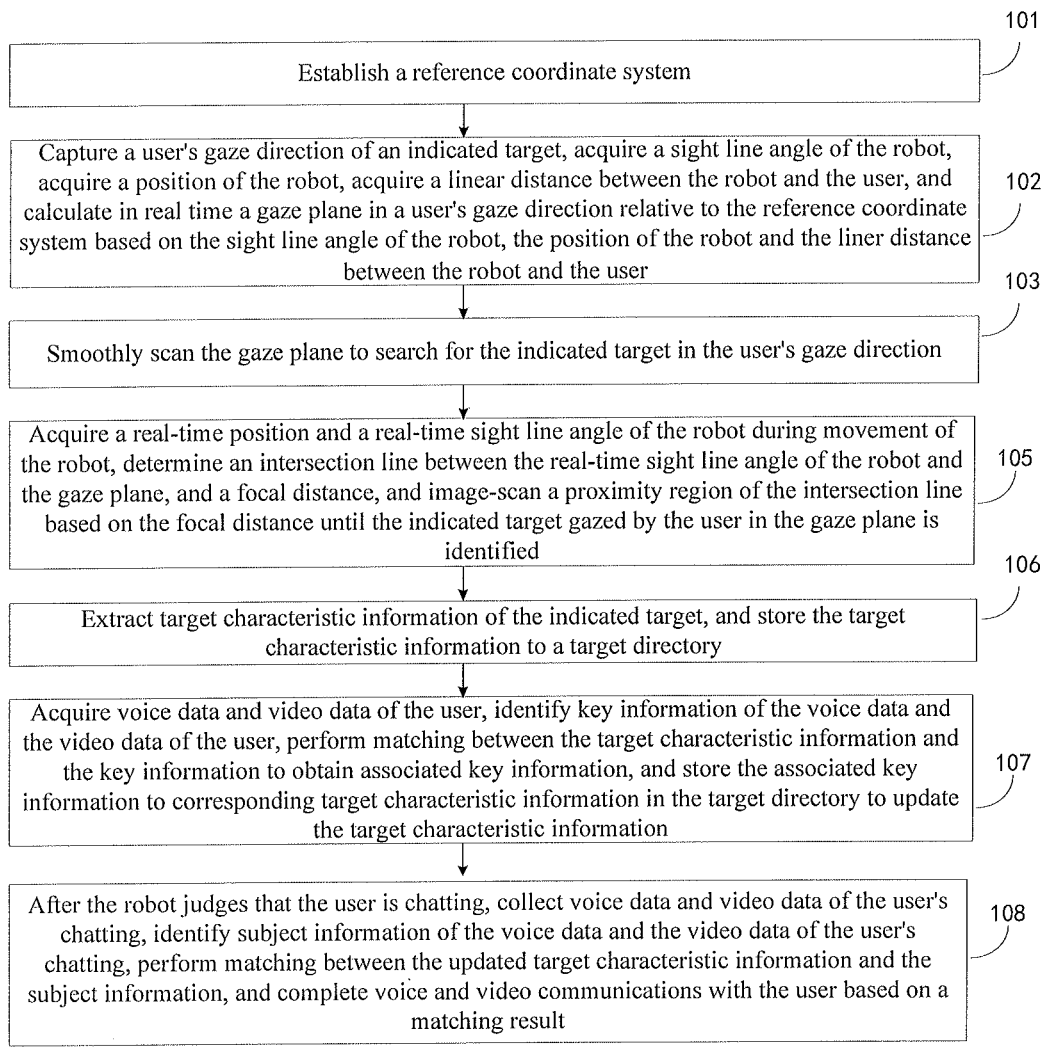
FIG. 4 is a schematic flowchart of another method for controlling a robot according to an embodiment of the present application.

In still another embodiment, as illustrated in FIG. 4, after the robot finds the indicated target in the user's gaze direction, the robot may perform further operations. The method for controlling a robot further includes the following step:

Step 106: Target characteristic information of the indicated target is extracted, and the target characteristic information is stored to a target directory.

A target directory for storing target characteristic information may be set on the robot control server or a memory of the robot.

The target characteristic information may be various attributes of the target, for example, name, position, belonging, shape, size, color, price, preference degree of the user, purchase way, purchase reason and the like.

The target characteristic information of the indicated target may be specifically extracted by the graph search method, or extracted by video characteristics, or extracted by voice data of the user. Specifically, in some embodiments, as illustrated in FIG. 4, the method for controlling a robot further includes the following step:

Step 107: Voice data and video data of the user are acquired, key information of the voice data and the video data of the user is identified, matching is performed between the target characteristic information and the key information to obtain associated key information, and the associated key information is stored to corresponding target characteristic information in the target directory to update the target characteristic information.

In the target directory, a target characteristic information field has a plurality of attributes, associated key information is acquired by matching the target characteristics information with the key information, and afterwards an attribute column of the associated key information is added to the corresponding target characteristic information. In this way, the attributes of the target characteristic information field are increased, which is equivalent to update of the target characteristic information.

For example, the method for controlling a robot may better help the robot to collect information when the robot has dialogs with two or more persons. For example, when the robot is in an idle state or still has the capability to concern persons around in an auditory or visual fashion, if the robot hears and sees multiple persons are in the dialogs, and a person indicates an article to another person or multiple persons during the dialogs, the robot may still know what the persons are talking about by this method (by acquiring voice data and video data of the user), and comments on the article (by identifying key information of the voice data and the video data of the user), or even may join the discussions. That is, the robot may associate the auditory information and the visual information (matching the target characteristic information with the key information to found the associated key information), and hence may collect related user information. In this way, the robot may more smartly have a dialog with the user. For example, two persons are talking about a ceramic vase for decoration in a house, the owner may speak to a guest "How about this? I really like it," while gazing the vase, and the guest may answer "this vase is really beautiful, pretty good, and where did you buy it"? . . . . In a conventional way, the robot may hear the dialogs between the user and the guest, but may not definitely know what article they are talking about. As such, the collected voice information is not useful. With the method for controlling a robot according to this embodiment, it is a great probability that the robot knows, by vision, the article that the user is talking about, and associates the voice information with the visual article to know that the user likes this vase very much, where the user purchase this vase, and how much this vase is and the like information. In this way, the robot knows more about the user, and thus may provide more ideal and smarter services for the user.

In yet still another embodiment, dialogs between the robot and the user, or discussions between the robot and multiple persons are embodied. As illustrated in FIG. 4, the method for controlling a robot further includes the following step:

Step 108: After the robot judges that the user is chatting, voice data and video data of the user's chatting are collected, subject information of the voice data and the video data of the user's chatting is identified, matching is performed between the updated target characteristic information and the subject information, and voice and video communications with the user are completed based on a matching result.

When the robot has a voice or video communication with the user, the robot judges that the user is chatting with the robot. For example, when the robot captures that the sight line of the user falls on the head of the robot or the user gazes the robot and calls the name or the like of the robot, it is determined that the user is chatting with the robot. The robot firstly acquires voice data and video data of user's chatting, identifies subject information of the voice data and the video data of the user's chatting, calls the target characteristic information in the updated target directory, and matches the updated target characteristic information with the subject information to output content communicated between the robot and the user, wherein voices and actions may be output. In this way, the robot is smarter, and may provide more ideal and smarter services for the user, and thus the user experience may be enhanced.

Figure 5:
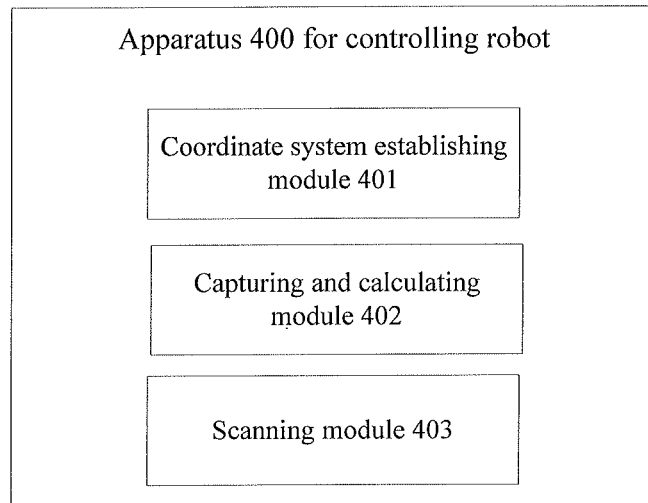
FIG. 5 is a schematic structural diagram of a robot apparatus according to an embodiment of the present application.

An embodiment of the present application further provides a robot apparatus 400. As illustrated in FIG. 5, the robot apparatus 400 includes a coordinate system establishing module 401, a capturing and calculating module 402 and a scanning module 403.

The coordinate system establishing module 401 is configured to establish a reference coordinate system.

The capturing and calculating module 402 is configured to capture a user's gaze direction indicative of a target article, acquire a sight line angle of the robot, acquire a position of the robot, acquire a linear distance between the robot and the user, and calculate in real time a gaze plane in a user's gaze direction relative to the reference coordinate system based on the sight line angle of the robot, the position of the robot and the liner distance between the robot and the user.

The scanning module 403 is configured to smoothly scan the gaze plane by the robot to search for the indicated target in the user's gaze direction.

It should be noted that the robot apparatus 400 according to the embodiment of the present application and the method for controlling a robot according to the embodiment of the present application are based on the same inventive concept, and technical content in the method embodiment may be exchangeably applied to the apparatus embodiment, which is thus not described herein any further.

The embodiment of the present application achieves the following beneficial effects: The method for controlling a robot according to the embodiment of the present application includes: establishing a reference coordinate system; capturing a user's gaze direction of an indicated target, acquiring a sight line angle of the robot, acquiring a position of the robot, acquiring a linear distance between the robot and the user, and calculating in real time a gaze plane in a user's gaze direction relative to the reference coordinate system based on the sight line angle of the robot, the position of the robot and the liner distance between the robot and the user; and smoothly scanning the gaze plane by at least one robot to search for the indicated target in the user's gaze direction. Relative to the solution that the robot searches for a target based on simpler voice instruction from the user in the related art, in the method according to the embodiment of the present application, the robot smoothly scans the gaze plane to search the indicated target, such that the search range is small, the search failure rate is low, and the user experience is better. In addition, in the related art, the robot fails to acquire the line-of-sight line of the user. However, in the method according to the embodiment of the present application, the robot may capture the user's gaze direction, and calculate in real time the gaze plane of the gaze direction relative to the reference coordinate system. By scanning the gaze plane, the robot may acquire what target the user gazes, and the success rate of searching for the target is improved, and the user experience is enhanced.

Figure 6:
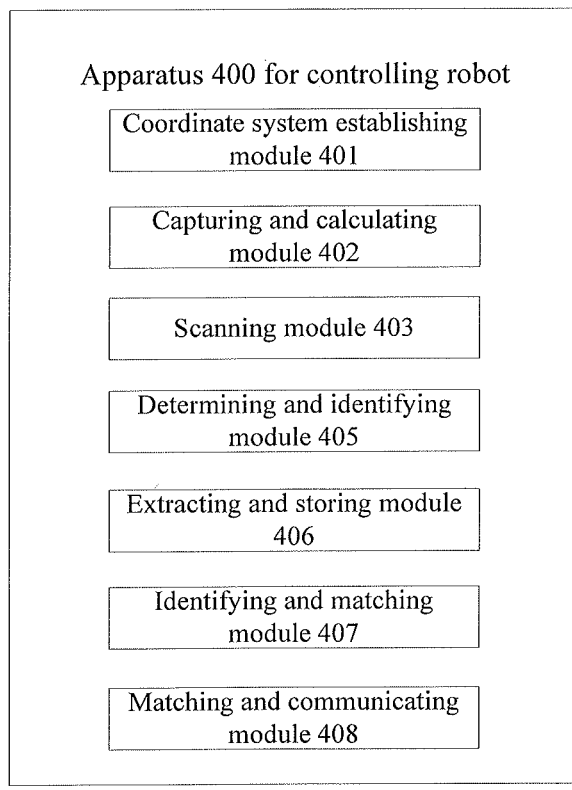
FIG. 6 is a schematic structural diagram of another robot apparatus according to still another embodiment of the present application.

If the position of the robot is not ideal, the robot needs to move to approach the gaze plane to find a position where the gaze plane may be clearly captured and the gaze plane may be smoothly scanned. In this case, the robot needs to be controlled to move. In some embodiments, as illustrated in FIG. 6, the robot apparatus 400 further includes:

a determining and identifying module 405, configured to acquire a real-time position and a real-time sight line angle of the robot by the robot during movement of the robot, determine an intersection line between the real-time sight line angle of the robot and the gaze plane, and a focal distance, and image-scan a proximity region of the intersection line based on the focal distance until the indicated target gazed by the user in the gaze plane is identified.

The embodiment of the present application achieves the following beneficial effects: In the apparatus 400 for controlling a robot according to the embodiment of the present application, during the movement of the robot, the real-time position and the real-time sight line angle of the robot are acquired, and the intersection line of the real-time sight line angle of the robot and the gaze plane, and the focal distance are acquired. In this way, the focus of the camera of the robot is controlled to fall in the gaze plane, such that a clear image that may include the indicated target is captured, wherein the image is specifically an image captured for the proximity region of the intersection line. During the movement of the robot, the robot may image-scan the proximity region of the intersection line based on the focal distance, until the indicated target gazed by the user in the gaze plane is identified. During this process, the desired parameters may all be acquired in real time, the indicated target may be quickly and accurately identified, and the user experience is better.

Further, the sight line angle of the robot is an optical axis of the sight line of the robot, and the capturing and calculating module 402 is further configured to:

calculate coordinates (m, n) of the robot in the reference coordinate system are calculated based on the position of the robot, and an included angle $\gamma$ between the optical axis of the sight line of the robot and the X axis of the reference coordinate system; calculate an included angle $\beta$ between a straight line of the line between the position of the user and the position of the robot, and the optical axis of the sight line of the robot is calculated based on the sight line angle of the robot, the position of the robot and the position of the user; an included angle $\alpha$ between the straight line of the line between the position of the user and the position of the robot, and the user's gaze direction is calculated.

In a three-dimensional space, the gaze plane is a plane perpendicular to the ground, and a straight line of the user's gaze direction is obtained by viewing the gaze plane from the top. The linear equation is defined as y=k*x+b, and the gaze plane is specifically calculated by the following equation:

$$y=\tan(\alpha+\beta+\gamma)*x+n+d*\sin(\beta+\gamma)-\tan(\alpha+\beta+\gamma)*(m+d*\cos(\beta+\gamma))$$

In the equation, d is a linear distance between the robot and the user.

The gaze plane is a plane that is along a forward direction of the linear equation y=tan(α+β+γ)*x+n+d*sin(β+γ)−tan(α+β+γ)*(m+d*cos(β+γ)) and perpendicular to the ground, with (m+d*cos(β+γ), n+d*sin(β+γ)) as a start point.

Further, the real-time sight line angle of the robot is a real-time optical axis of the sight line of the robot, and the capturing and calculating module 405 is further configured to:

calculate real-time coordinates (p, q) of the robot in the reference coordinate system, and an included angle γ″ between the real-time optical axis of the sight line of the robot and the X axis of the reference coordinate system are calculated based on the real-time position of the robot; and if an intersection between the real-time optical axis of the sight line of the robot and the straight line of the user's gaze direction is H, distance A'H is the focal distance. A straight line of NH is defined as the linear equation y=k*x+b, and the focal distance may be specifically calculated by the following equation:

$$y=\tan(\gamma'')*x+q-\tan(\gamma'')*p$$

The linear equation and a quadric equation of the straight line of A'H and the straight line of the user's gaze direction are solved in a combination fashion, and solved coordinates (x, y) are coordinates of intersection H between the real-time optical axis of the sight line of the camera of the robot and the straight line of the user's gaze direction.

Distance A'H is calculated based on the coordinates of point H and the coordinates of point A', which is the focal distance.

$$A'H=\sqrt{(x-p)^2+(y-q)^2}$$

In the above technical solution, by analyzing the facial angle of the user, an angle α between the user and the optical axis of the sight line of the robot is acquired. If other robots around the user are capable of acquiring the linear equation of the straight line of the line between the position of the user and the position of the robot, the included angle and or the linear equation may be likewise synchronized to the robot.

Specifically, the robot includes a networking module configured to network with the robots under the same coordinate systems, wherein the networking module is configured to share data of the gaze plane.

The embodiment of the present application achieves the following beneficial effects: By the network module, the robot is networked to the robots under the same coordinate system, and the robots share the data in the gaze plane; based on states of current processing tasks of a plurality of robots and considering the position of the robots, facing angle and the like, a robot control server may control, by calculation or analysis, one of the robots to search for the indicated target in the user's gaze direction, such that the plurality of robots collaboratively operate. In this way, the operating efficiency is improved, the user requirements are quickly satisfied, and the user experience is enhanced. The same coordinate system is the reference coordinate system.

In still another embodiment, after the robot finds the indicated target in the user's gaze direction, the robot may perform further operations. The robot apparatus 400 further includes:

an extracting and storing module 406, configured to extract target characteristic information of the indicated target, and store the target characteristic information to a target directory.

The target characteristic information of the indicated target may be specifically extracted by the graph search method, or extracted by video characteristics, or extracted by voice data of the user. Specifically, in some embodiments, as illustrated in FIG. 6, the robot apparatus 400 further includes:

an identifying and matching module 407, configured to acquire voice data and video data of the user, identify key information of the voice data and the video data of the user, match the target characteristic information with the key information to obtain associated key information, and store the associated key information to corresponding target characteristic information in the target directory to update the target characteristic information.

For example, the robot apparatus 400 may better help the robot to collect information when the robot has dialogs with two or more people. The identifying and matching module 407 is further configured to acquire and identify the key information of the voice data and the video data of the user, and match the target characteristic information with the key information to find the associated key information and store and update the same. By matching the target characteristic information with the key information, it is a great probability that the robot knows, by audition or vision, the article that the user is talking about, and associates the voice information with the article to find the associated key information. That is, the robot knows more about the user, such that the robot is smarter.

In yet still another embodiment, dialogs between the robot and the user, or discussions between the robot and multiple persons are embodied. As illustrated in FIG. 6, the robot apparatus 400 further includes:

a matching and communicating module 408, configured to: after the robot judges that the user is chatting, collect voice data and video data of the user's chatting, identify subject information of the voice data and the video data of the user's chatting, match the updated target characteristic information with the subject information, and carry out voice and video communications with the user based on a matching result.

When the robot has a voice or video communication with the user, the robot firstly acquires voice data and video data of user's chatting, identifies subject information of the voice data and the video data of the user's chatting, calls the target characteristic information in the updated target directory, and matches the updated target characteristic information with the subject information to output content communicated between the robot and the user, wherein voices and actions may be output. In this way, the robot is smarter, and thus the user experience may be enhanced.

Figure 7:
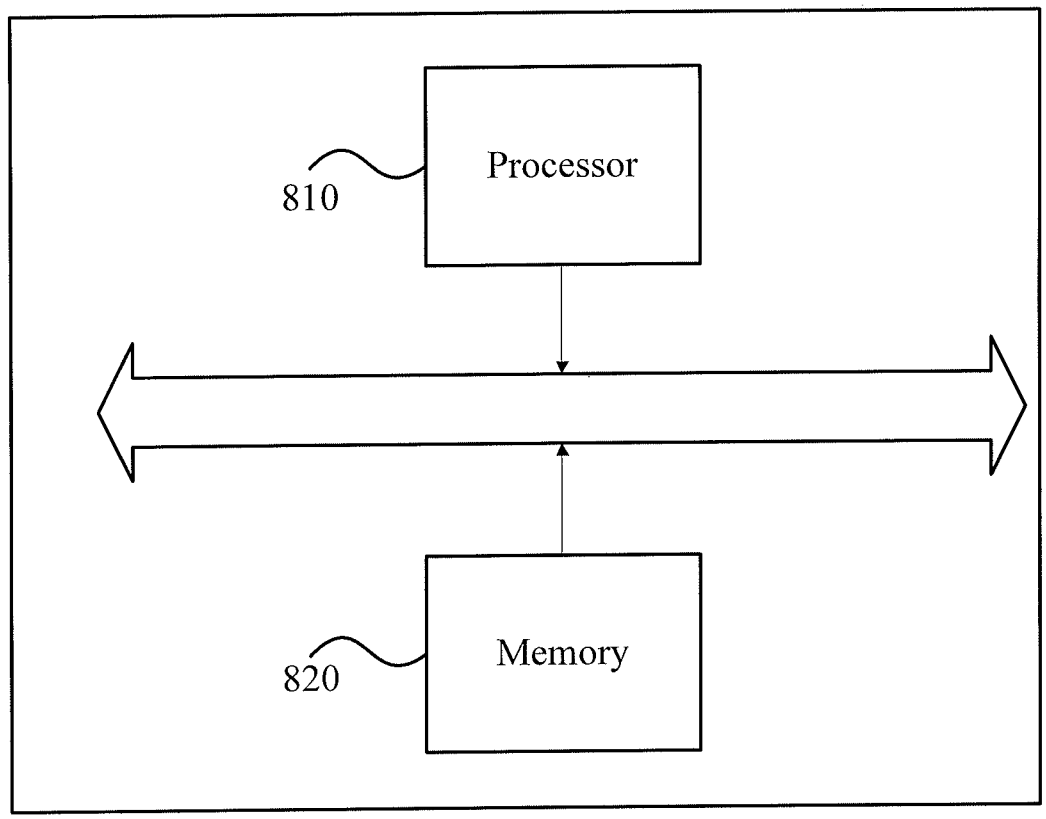
FIG. 7 is a schematic structural diagram of a robot device according to an embodiment of the present application.

FIG. 7 is a schematic structural diagram of hardware of a robot device according to an embodiment of the present application. The robot device may any robot device 800 suitable for performing the method for controlling a robot. The robot device 800 may be further provided with one or a plurality of power assemblies configured to drive the robot to move along a specific trajectory.

As illustrated in FIG. 7, the device includes at least one processor 810 and a memory 820, and FIG. 7 uses one processor 810 as an example.

The at least one processor 810 and the memory 820 may be connected via a bus or in another fashion, and FIG. 7 uses the bus as an example.

The memory 820, as a non-volatile computer-readable storage medium, may be configured to store non-volatile software programs, non-volatile computer-executable programs and modules, for example, the program instructions/modules (for example, the coordinate system establishing module 401, the capturing and calculating module 402 and the scanning module 403 as illustrated in FIG. 5, the coordinate system establishing module 401, the capturing and calculating module 402, the scanning module 403, the determining and identifying module 405, the extracting and storing module 406, the identifying and matching module 407, and the matching and communicating module 408 as illustrated in FIG. 6) corresponding to the methods for controlling a robot in the embodiments of the present application. The non-volatile software programs, instructions and modules stored in the memory 810, when being executed, cause the processor 820 to perform various function applications and data processing of a server, that is, performing the method for controlling a robot in the above method embodiments.

The memory 820 may include a program memory area and data memory area, wherein the program memory area may store operation systems and application programs needed by at least one function; and the data memory area may store data created according to the use of the robot apparatus. In addition, the memory 820 may include a high speed random access memory, or include a non-volatile memory, for example, at least one disk storage device, a flash memory device, or another non-volatile solid storage device. In some embodiments, the memory 820 optionally includes memories remotely configured relative to the processor 820. These memories may be connected to the robot apparatus over a network. Examples of the above network include, but not limited to, the Internet, Intranet, local area network, mobile communication network and a combination thereof.

The one or more modules are stored in the memory 820, and when being executed by the at least one processor 810, perform the method for controlling a robot in any of the above method embodiments.

Professional personnel should be further aware that with reference to the embodiments of the present application disclosed herein, various exemplary units and algorithm steps may be implemented in the form of electronic hardware, computer software or a combination thereof. To clearly describe interchangeability between the hardware and software, the above description has generally illustrates the compositions and steps of the various example according to the functions. Whether such functions are implemented in the form of software or hardware depends on the specific application and the design restrictions applied to the entire system. Professional technical personnel may implement the described functions by using different methods for each specific application. However, such implementation shall not be deemed as going beyond the scope of the present application. The computer software program may be stored in a computer readable storage medium, wherein the computer software program, when being executed, may perform the steps and processes according to the above method embodiments. The storage medium may be any medium capable of storing program codes, such as read-only memory (ROM), a random access memory (RAM), a magnetic disk, or a compact disc-read only memory (CD-ROM).

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

What is claimed is:

1. A method for controlling a robot, comprising:
   establishing a reference coordinate system;
   capturing a user's gaze direction of an indicated target;
   acquiring a sight line angle of the robot;
   acquiring a position of the robot;
   acquiring a linear distance between the robot and the user;
   calculating in real time a gaze plane in a user's gaze direction relative to the reference coordinate system based on the sight line angle of the robot, the position of the robot and the liner distance between the robot and the user; and
   smoothly scanning the gaze plane by the robot to search for the indicated target in the user's gaze direction.

2. The method according to claim 1, wherein the robot comprises a networking module configured to network with a robot under the same coordinate system, wherein the network module is configured to share data of the gaze plane.

3. The method according to claim 2, further comprising:
   acquiring a real-time position and a real-time sight line angle of the robot by the robot during movement of the robot;
   determining an intersection line between the real-time sight line angle of the robot and the gaze plane, and a focal distance; and
   image-scanning a proximity region of the intersection line based on the focal distance until the indicated target gazed by the user in the gaze plane is identified.

4. The method according to claim 3, further comprising:
   extracting target characteristic information of the indicated target; and
   storing the target characteristic information to a target directory.

5. The method according to claim 4, further comprising:
   acquiring voice data and video data of the user;
   identifying key information of the voice data and the video data of the user;
   matching the target characteristic information with the key information to obtain associated key information; and
   storing the associated key information to corresponding target characteristic information in the target directory to update the target characteristic information.

6. The method according to claim 5, further comprising:
after the robot judges that the user is chatting, collecting voice data and video data of the user's chatting;
identifying subject information of the voice data and the video data of the user's chatting;
matching the updated target characteristic information with the subject information; and
carrying out voice and video communications with the user based on a matching result.

7. A robot device, comprising:
at least one processor; and
a memory communicably connected to the at least one processor; wherein
the memory stores an instruction program executable by the at least one processor, wherein, the instruction program, when being executed by the at least one processor, cause the at least one processor to perform the steps of: establishing a reference coordinate system;
capturing a user's gaze direction of an indicated target;
acquiring a sight line angle of the robot;
acquiring a position of the robot;
acquiring a linear distance between the robot and the user;
calculating in real time a gaze plane in a user's gaze direction relative to the reference coordinate system based on the sight line angle of the robot, the position of the robot and the liner distance between the robot and the user; and
smoothly scanning the gaze plane to search for the indicated target in the user's gaze direction.

8. The robot device according to claim 7, wherein the robot comprises a networking module configured to network with a robot under the same coordinate system, wherein the network module is configured to share data of the gaze plane.

9. The robot device according to claim 8, wherein the instruction program, when being executed by the at least one processor, further cause the at least one processor to perform the steps of:
acquiring a real-time position and a real-time sight line angle of the robot by the robot during movement of the robot;
determining an intersection line between the real-time sight line angle of the robot and the gaze plane, and a focal distance; and
image-scanning a proximity region of the intersection line based on the focal distance until the indicated target gazed by the user in the gaze plane is identified.

10. The robot device according to claim 9, wherein the instruction program, when being executed by the at least one processor, further cause the at least one processor to perform the steps of:
extracting target characteristic information of the indicated target; and
storing the target characteristic information to a target directory.

11. The robot device according to claim 10, wherein the instruction program, when being executed by the at least one processor, further cause the at least one processor to perform the steps of:
acquiring voice data and video data of the user;
identifying key information of the voice data and the video data of the user;
matching the target characteristic information with the key information to obtain associated key information; and storing the associated key information to corresponding target characteristic information in the target directory to update the target characteristic information.

12. The robot device according to claim 11, wherein the instruction program, when being executed by the at least one processor, further cause the at least one processor to perform the steps of:
after the robot judges that the user is chatting, collecting voice data and video data of the user's chatting;
identifying subject information of the voice data and the video data of the user's chatting;
matching the updated target characteristic information with the subject information; and
carrying out voice and video communications with the user based on a matching result.

13. A computer program product comprising a software code portion, wherein the software code portion is configured to, when being run in a memory of a computer, perform steps of:
establishing a reference coordinate system;
capturing a user's gaze direction of an indicated target;
acquiring a sight line angle of the robot;
acquiring a position of the robot;
acquiring a linear distance between the robot and the user;
calculating in real time a gaze plane in a user's gaze direction relative to the reference coordinate system based on the sight line angle of the robot, the position of the robot and the liner distance between the robot and the user; and
smoothly scanning the gaze plane to search for the indicated target in the user's gaze direction.

14. The computer program product according to claim 13, wherein the robot comprises a networking module configured to network with a robot under the same coordinate system, wherein the network module is configured to share data of the gaze plane.

15. The computer program product according to claim 14, wherein the software code portion is further configured to, when being run in a memory of a computer, perform steps of:
acquiring a real-time position and a real-time sight line angle of the robot by the robot during movement of the robot;
determining an intersection line between the real-time sight line angle of the robot and the gaze plane, and a focal distance; and
image-scanning a proximity region of the intersection line based on the focal distance until the indicated target gazed by the user in the gaze plane is identified.

16. The computer program product according to claim 15, wherein the software code portion is further configured to, when being run in a memory of a computer, perform steps of:
extracting target characteristic information of the indicated target; and
storing the target characteristic information to a target directory.

17. The computer program product according to claim 16, wherein the software code portion is further configured to, when being run in a memory of a computer, perform steps of:
acquiring voice data and video data of the user;
identifying key information of the voice data and the video data of the user;
matching the target characteristic information with the key information to obtain associated key information; and storing the associated key information to corresponding target characteristic information in the target directory to update the target characteristic information.

18. The computer program product according to claim 17, wherein the software code portion is further configured to, when being run in a memory of a computer, perform steps of:
   after the robot judges that the user is chatting, collecting voice data and video data of the user's chatting;
   identifying subject information of the voice data and the video data of the user's chatting;
   matching the updated target characteristic information with the subject information; and
   carrying out voice and video communications with the user based on a matching result.

* * * * *